United States Patent
Bourcier et al.

(10) Patent No.: US 7,704,342 B2
(45) Date of Patent: Apr. 27, 2010

(54) GLASS LAMINATION PROCESS

(75) Inventors: David Paul Bourcier, Ludlow, MA (US); Francois Andre Koran, Longmeadow, MA (US); Jan Herbert Liliane Crommen, Atlixco (MX)

(73) Assignee: Solutia, Inc., St. Louis, MO (US)

( * ) Notice: Subject to any disclaimer, the term of this patent is extended or adjusted under 35 U.S.C. 154(b) by 187 days.

(21) Appl. No.: 10/294,728

(22) Filed: Nov. 15, 2002

(65) Prior Publication Data
US 2003/0148114 A1    Aug. 7, 2003

Related U.S. Application Data

(60) Provisional application No. 60/344,263, filed on Dec. 27, 2001.

(51) Int. Cl.
*B32B 17/10* (2006.01)

(52) U.S. Cl. .................... 156/99; 156/103; 156/104; 156/106; 156/107; 428/437; 428/435; 428/441

(58) Field of Classification Search .................... 156/99, 156/102–106, 285–286; 428/430, 435–437, 428/441–442, 412, 457–458; 296/84.1; 52/786.11, 786.12
See application file for complete search history.

(56) References Cited

U.S. PATENT DOCUMENTS

| | | | |
|---|---|---|---|
| 2,156,680 A | 12/1936 | Dennison | |
| 2,235,958 A | 2/1937 | Boicey | |
| 2,983,635 A | 5/1961 | Richardson | |
| 3,038,825 A | 6/1962 | Little | |
| 3,234,062 A | 2/1966 | Morris | |
| 3,262,836 A | 7/1966 | Lavin et al. | |
| 3,396,074 A | 8/1968 | Christensen | |
| 3,407,131 A * | 10/1968 | Hailstone | 204/165 |
| 3,518,137 A | 6/1970 | Hamilton | |
| 3,524,778 A | 8/1970 | Jensch et al. | |
| 3,551,281 A | 12/1970 | Takaura et al. | |
| 3,556,890 A | 1/1971 | Buckley et al. | |
| 3,816,201 A * | 6/1974 | Armstrong et al. | 156/106 |
| 3,868,286 A | 2/1975 | Fariss et al. | |
| 4,100,398 A | 7/1978 | Levin | |
| 4,277,538 A | 7/1981 | Beckmann et al. | 428/429 |
| 4,292,372 A | 9/1981 | Moynihan | |
| 4,341,576 A | 7/1982 | Lewis | |
| 4,470,858 A | 9/1984 | McMaster | |
| 4,481,060 A | 11/1984 | Hayes | |
| 4,798,690 A | 1/1989 | Levy | |
| 4,952,459 A | 8/1990 | Thatcher | |
| 4,968,744 A | 11/1990 | Misra et al. | |
| 4,988,398 A * | 1/1991 | Pereman et al. | 156/64 |

(Continued)

FOREIGN PATENT DOCUMENTS

DE    19643404    4/1998

(Continued)

*Primary Examiner*—Richard Crispino
*Assistant Examiner*—Christopher Schatz
(74) *Attorney, Agent, or Firm*—Fitzpatrick, Cella, Harper & Scinto (57) ABSTRACT

Glass laminates are prepared using low-water content plastic interlayer material, such as polyvinylbutyral interlayer sheets, by a process employing nip roll de-airing, and high temperature finishing at atmospheric pressure.

20 Claims, 3 Drawing Sheets

U.S. PATENT DOCUMENTS

| | | | |
|---|---|---|---|
| 5,013,780 A | 5/1991 | Fariss et al. | |
| 5,049,433 A | 9/1991 | Leotta | |
| 5,069,734 A | 12/1991 | Kavanagh et al. | |
| 5,118,371 A | 6/1992 | Hori et al. | |
| 5,130,370 A | 7/1992 | Udipi et al. | |
| 5,137,954 A | 8/1992 | DasGupta et al. | |
| 5,300,184 A | 4/1994 | Masunaga | |
| 5,364,487 A | 11/1994 | Friske et al. | |
| 5,384,346 A | 1/1995 | Gutweiler et al. | |
| 5,425,977 A | 6/1995 | Hopfe | |
| 5,482,767 A | 1/1996 | Karagiannis et al. | |
| 5,536,347 A | 7/1996 | Moran | |
| 5,846,363 A | 12/1998 | Haverkamp | |
| 5,853,516 A * | 12/1998 | Lehto | 156/102 |
| 6,080,260 A | 6/2000 | Yasunaka et al. | |
| 6,093,471 A | 7/2000 | Hopfe et al. | |
| 6,136,486 A | 10/2000 | Nguyen | |
| 6,261,398 B1 | 7/2001 | Costa | 156/102 |
| 6,280,547 B1 * | 8/2001 | Balduin et al. | 156/104 |
| 2001/0007270 A1 | 7/2001 | Balduin et al. | |

FOREIGN PATENT DOCUMENTS

| | | | |
|---|---|---|---|
| EP | 0 331 648 A2 | | 9/1989 |
| EP | 0707950 | | 4/1996 |
| EP | 1029663 | | 8/2000 |
| EP | 1 233 007 A1 | | 8/2002 |
| FR | 2330658 | | 11/1976 |
| GB | 2236277 | | 4/1991 |
| JP | 2001-150540 | | 6/2001 |
| JP | 2001-163641 | | 6/2001 |
| JP | 2001-192244 | | 7/2001 |
| JP | 2001-226153 | | 8/2001 |
| RU | 94041074 | | 9/1996 |
| WO | WO 88/03517 | * | 5/1988 |
| WO | WO 91/01880 | * | 2/1991 |
| WO | 98/17468A22 | | 4/1998 |
| WO | 01/30568 | | 5/2001 |
| ZA | 968804 | | 10/1996 |

* cited by examiner

GLASS LAMINATION PROCESS

This application claims the benefit of U.S. Provisional Application No. 60/344,263, filed Dec. 27, 2001, herein incorporated by reference.

BACKGROUND OF THE INVENTION

Field of the Invention

Safety glass typically refers to a transparent laminate comprised of a polyvinyl butyral sheet (hereinafter "PVB sheet") sandwiched between two panes of glass. Safety glass often is used to provide a transparent barrier in architectural and automotive openings. Its main function is to absorb energy, such as caused by a blow from an object, without allowing penetration through the opening, thus minimizing damage or injury to the objects or persons within an enclosed area. Safety glass also can be used to provide other beneficial effects such as to attenuate acoustic noise, reduce UV and/or IR light transmission, and/or enhance the aesthetic appeal of window openings.

Safety glass typically is formed by a process in which two layers of glass and a plastic interlayer, such as PVB, are assembled into a pre-press, tacked into a pre-laminate, and finished into an optically clear laminate. The assembly phase involves laying down a piece of glass, overlaying a PVB sheet, laying down a second piece of glass, and then trimming the excess PVB to the edges of the glass layers. The tacking step often is complex and involves expelling most of the air from the interfaces and partially bonding the PVB to the glass. The finishing step, typically carried out at high temperature and pressure, completes the mating of the glass to the PVB.

Temperature, pressure, and time are the three basic process variables that can be leveraged in a lamination process. During final lamination, temperatures typically are elevated up to about 140° C. to soften the interlayer, helping conform it to the surface of the glass substrate and flow the interlayer into areas where the substrate spacing may be uneven. Once the interlayer is conformed, the mobile polymer chains of the interlayer develop adhesion with the glass. Elevated temperatures also accelerate the diffusion of residual air and/or moisture pockets from the glass/PVB interface into the polymeric interlayer.

Pressure appears to play two critical roles in the production of glass laminates. Firstly, pressure promotes PVB flow. Secondly, it suppresses bubble formation that otherwise would be caused by the combined vapor pressure of water and air trapped in the system. The latter role is, undoubtedly, the most significant constraint in glass lamination. Water and air trapped in a pre-press (i.e., the layered assembly of unbonded glass and plastic) tend to expand into bubbles when the pre-press assembly is heated at atmospheric pressure to finishing temperatures greater than about 100° C. (the boiling point of water at 1 atm. is 100° C.). To suppress bubble formation, heat accompanied with overwhelming pressure typically is applied to the assembly in an autoclave vessel, so as to counteract the expansion forces generated when air and water trapped within the pre-press are heated.

Time ultimately plays the most important role in lamination. While temperature and pressure can accelerate lamination, a certain critical time must always elapse in order to produce good quality laminated glass.

Unfortunately, even a careful optimization of these three controllable process variables often is insufficient to make good quality laminated glass. If too much air is trapped in the laminate during the early tacking step, no reasonable amount of time, temperature, and pressure can produce a good laminate. Safety glass laminators are well aware of the delicate relationship between trapped interfacial gases and subsequent high temperature bubble formation, and constantly are refining the tacking process to minimize interfacial gases. Virtually all current methods of making laminated glass include a tacking/de-air step that involves either squeezing a pre-press through a nip roll means, or enclosing a pre-press with a bag or ring, and drawing a vacuum to evacuate the gases. The prior art is replete with various de-airing techniques designed to minimize trapped air as a means of improving a laminate's resistance to bubble formation during the final high temperature finishing step. Despite this, nearly all of these prior lamination processes require pressurized autoclave finishing treatment at pressures in excess of about 10 atmospheres and temperatures in excess of about 130° C. in order to make acceptable quality laminated glass.

One notable patented prior art process that does not operate at high pressures capitalizes on an improved de-airing procedure (using an embossed PVB sheet in a vacuum process) in order to eliminate the need for standard autoclave treatment. This process is described in U.S. Pat. No. 5,536,347, incorporated by reference herein, which teaches a vacuum de-airing, non-autoclave method wherein PVB sheet in the 0.4 to 0.6 weight percent water range is utilized in fabricating a pre-laminate. Pre-laminates from this vacuum-based, non-autoclave process are so well de-aired that they can be processed using an atmospheric pressure, high temperature finishing step that avoids the formation of interfacial bubbles.

The target interlayer sheet water content used throughout glass lamination history appears to have remained relatively constant in the range of about 0.30 to about 0.60 weight percent. While, as noted above, the relationship between trapped air and bubble formation has been recognized and explored in the prior art, the relationship between the water content of a PVB interlayer material and subsequent bubble formation in a laminate has not been leveraged effectively.

SUMMARY OF THE INVENTION

It now surprisingly has been discovered, according to the present invention, that by a novel process preferably including use of a PVB interlayer having a lowered water content in preparing a pre-press assembly, a lamination process is achieved in which autoclave finishing treatment is not required. The invention comprises a process for making laminated glass by positioning a plastic material, having a moisture content below 0.35 percent by weight, opposite at least one rigid substrate to form an assembly, pre-heating at least one rigid substrate, or the plastic material, or any combination thereof to a tacking temperature, tacking the plastic material to at least one rigid substrate using a short-term pressure application to form a pre-laminate assembly, and finish heating the pre-laminate assembly at a temperature and for a time effective to bond the plastic material to the substrates to form a laminate. The invention further comprises a process for making laminated glass by interposing a plastic material, having a moisture content below 0.35 percent by weight, between two rigid substrates to form an assembly, pre-heating at least one of the substrates, or the plastic material, or any combination thereof to a tacking temperature, tacking the plastic material to the two substrates using a short-term pressure application to form a pre-laminate assembly, and finish heating the pre-laminate assembly at a temperature and for a time effective to bond the plastic material to the substrates to form a laminate. The finish heating may be conducted at atmospheric pressure, thus enabling the production of glass laminates without the need for a standard pressurized autoclave step, which traditionally has been a key requirement to successful glass lamination. According to the presently disclosed concept, it now is recognized that there is a threshold value of combined water and air content in the interlayer and glass/interlayer interfaces, below which superatmospheric pressures are not required to avoid bubble formation at finishing temperatures above 100° C. In particular, it has been found that if the water content (moisture) of the PVB interlayer preferably is below about 0.30 percent by weight, more preferably about 0.01 to about 0.20 percent by weight, a pre-laminate (the de-aired and edge sealed assembly of glass and plastic layers which is only partially bonded together) can be made into a finished (fully bonded and clear) product meeting desired laminate quality and safety specifications, without using vacuum pressure to de-air the pre-laminate assembly, and without finish pressing in an autoclave.

By using PVB with low water content as the plastic interlayer material, laminate finishing temperatures, at reduced autoclave pressures or even at atmospheric pressures, can be used that are much higher than temperatures previously possible with nip-roll de-aired pre-laminate. Thus, the present invention makes it possible to produce laminates under atmospheric or reduced autoclave pressure conditions, at temperatures ranging from about 115° C. to about 230° C., preferably between about 125° C. to about 220° C.

In addition, the temperature dependent advantages of using high temperatures in the finishing step, such as dissolving air into the PVB, softening the PVB to fill the space occupied by the PVB between the rigid substrates and thereby conforming the substrate spacing to the substrate surfaces, developing adhesion, and relaxing residual stresses in the PVB, are all accomplished over a shorter time interval. More specifically, the time required to make finished laminates meeting established performance specifications may be reduced in the current process from a typical range of up to about 360 minutes, to less than 180 minutes, preferably about 0.5 minutes to about 180 minutes, more preferably about 2 minutes to about 60 minutes. The high temperature resistance property of the laminates of this invention also make them much less sensitive to temperature variations in the lamination process, thereby increasing yield rates.

Under some processing conditions, some limited finishing pressure may be utilized. Such finishing, nevertheless, would involve heating at a temperature, and for a time, effective to bond the plastic material to the substrates, under less than standard autoclave pressures. Preferably, pressures less than about three atmospheres are utilized in the finishing treatment where the plastic material is bonded to the substrates; most preferably, atmospheric pressure is used.

Apparatus for making a laminate according to the invention comprises: a primary heater unit for pre-heating a layer of plastic material to a tacking temperature; a tacking pressure means (such as a nip roll means) for applying a short term pressure application to a layered assembly of at least one rigid substrate and the layer of plastic material in order to tack the layer of plastic material to the rigid substrate, so as to form a prelaminate assembly; and, a finishing heater unit for heating the prelaminate assembly to a temperature and for a time effective to bond the plastic material to the rigid substrate.

DESCRIPTION OF THE DRAWINGS

Referring now to the drawings in which like elements are numbered alike, and wherein.

DESCRIPTION OF PREFERRED EMBODIMENTS

According to the invention, low moisture content plastic sheets preferably are employed in a lamination process. If necessary, plastic sheets initially are conditioned to low moisture (i.e. water content) before being assembled with rigid, transparent, preferably glass, substrates to form a pre-press assembly. The water content of the preferred PVB sheet in the pre-press may range as high as 0.35 percent by weight, but preferably should be below about 0.30 percent by weight, more preferably ranging from about 0.01 percent by weight to about 0.20 percent by weight. Most preferably, the water content ranges between about 0.03 and about 0.18 percent by weight of the PVB sheet.

PVB sheet usable in this invention is commercially available from Solutia, Inc., St. Louis, Mo., as "Saflex®" interlayer. While not critical, sheet thickness preferably is about 0.25 to 4.0 mm, most preferably about 0.32 to 2.5 mm.

If conditioning of the PVB is required to achieve desired water content, the time and temperature of conditioning PVB sheet to provide the low moisture are not critical. A preferred conditioning time for PVB sheet, using an oven to vaporize water in the sheet, is approximately 30 to 60 minutes at temperatures between about 60° C. and about 70° C., and at about 5-10% relative humidity (RH)x in the oven. These conditions readily reduce the water content of a "Saflex®" PVB sheet to approximately 0.06 to 0.13 percent by weight. A microwave, infrared, or like environment also may be used for this purpose. Alternatively, a standard plastics drier, such as that used to dry plastic pellets prior to extrusion, may be utilized.

The preferred PVB interlayer typically contains about 10 to about 30 weight percent hydroxyl groups, expressed as polyvinyl alcohol, with the balance being primarily butyral, expressed as polyvinyl butyral. Acetate or other monomeric units may be included in the PVB, as disclosed for example in U.S. Pat. Nos. 4,968,744, and 5,130,370 herein incorporated by reference. Fillers, pigments, colorants, and other additives may be included in the sheet, for example, as disclosed in the aforesaid U.S. Pat. No. 5,130,370.

Plasticizer content in PVB sheet generally ranges between about 20 to 60 parts per 100 parts of PVB. Suitable plasticizers are known in the art, such as are disclosed in U.S. Pat. Nos. 4,292,372, 5,013,780, and 5,137,954, each of which is incorporated by reference herein. EP 877665B1 discloses a preferred plasticizer, tri-ethylene glycol di-2-ethyl hexanoate, and also is incorporated herein by reference.

In order to control adhesion between the PVB interlayer and the glass sheets of the finished laminate, adhesion control agents may be included in the PVB formulation. Traditional adhesion lowering compounds such as magnesium and potassium based salts may be incorporated into the plasticized PVB sheet. Magnesium-di-2-ethyl-butyrate, added at concentrations of about 0.1 to about 2.5 gram per kilogram of unplasticized PVB, is a preferred agent for lowering adhesion and improving the long-term stability of laminated glass. It further is preferred to add potassium acetate in a concentration of about 0.1 to about 1.5 grams per kilogram of unplasticized PVB.

The surface topography of the plastic material is not limiting in the present invention. Commercially available plastic interlayer material featuring standard surface topography can be used successfully to practice the invention. In addition, plastic material featuring a regular or an irregular rough or patterned surface readily can be utilized. Such surface topography may be effected by various techniques such as embossing, melt fracture, and the like. U.S. Pat. Nos. 5,595,818 and 4,654,179 describe a PVB with an irregular surface topography (hereinafter referred to as "random rough") that is preferred for use according to the present invention. Process robustness further can be enhanced by using a PVB sheet with a surface topography featuring straight regular channels, such as is described in U.S. Pat. Nos. 5,425,977 and 6,093,471, hereby incorporated herein by reference. Such PVB sheet is particularly preferred according to the present invention.

Typically, the glass sheets and PVB layer or layers are assembled together and excess PVB sheet outboard of the edges of the glass is removed by trimming (forming a pre-press). Cutting to the appropriate size may be done before or after assembly, as desired, or alternatively following the tacking step described hereafter.

Figure 1:
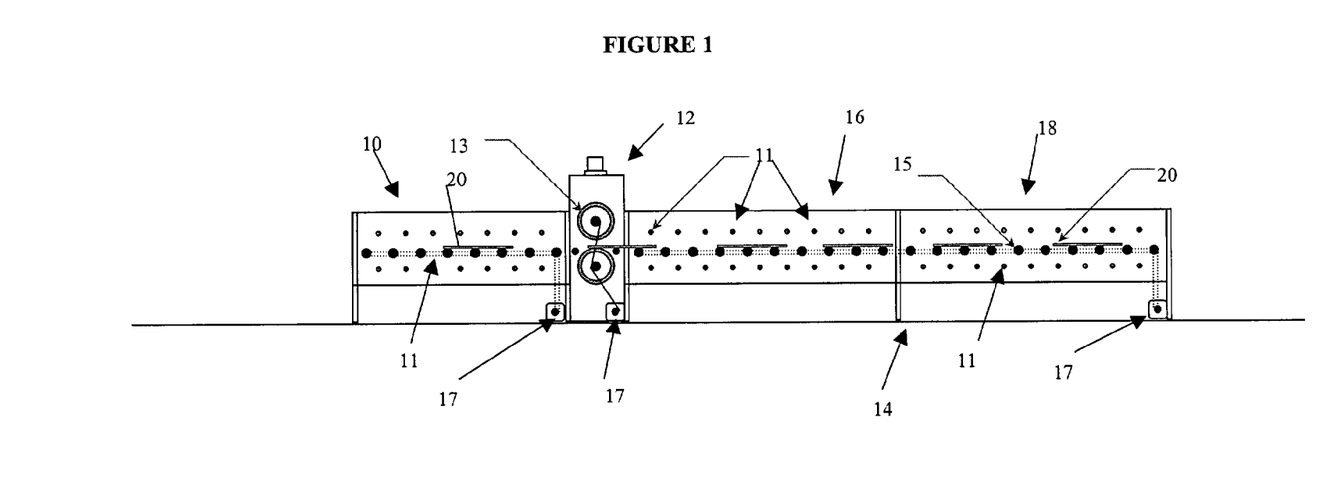
FIG. 1 is a schematic side view showing one embodiment of apparatus suitable for practicing the present invention. The apparatus as illustrated comprises a pre-heater unit, followed by a nip roll means, followed by a finishing heater unit.

The layers of the pre-press are brought to a temperature sufficient to tack the layers together in a subsequent tacking step. Tack temperature may vary with the formulation of the PVB layer (or other plastic layer used). For a low modulus interlayer, sufficient tack to keep the layers together may be achieved at room temperature. For most laminates containing a single PVB sheet between two glass sheets, sufficient tack can be developed at a tack temperature between about 40° C. and about 130° C., preferably between about 70° C. and about 100° C. As illustrated in FIG. 1, a glass/PVB/glass assembly 20, at this stage referred to as a pre-press, may be brought to tacking temperature in a pre-heater unit 10 comprising an oven enclosure equipped with an array of infrared heater tubes 11 through which the laminate 20 is conveyed on a bed of conveyor rollers 15 powered by a drive motor 17. Alternatively, convection heaters, microwaves, and other equivalent forms of supplying heat, or combinations thereof, also may be used to preheat the laminates.

The assembly of glass and PVB interlayer then is subjected to a short term tacking pressure sufficient to remove excess interlayer-glass interfacial air, cause the layers to adhere to each other, and to seal the edges to prevent air re-entry. The resulting combination of tacked layers is herein called a pre-laminate. The preferred technique of applying a tacking pressure is to utilize a nip roll means, which is known to those skilled in the art of safety glass laminate manufacture. As depicted in FIG. 1, a nip roll means 12 consists of a set of opposing nip rolls 13 with resilient surfaces, such as rubber, which rotate in opposite directions to pass the pre-press assembly 20 through a nip between such rolls. The pressure exerted on the assembly in the short term pressure application preferably is for a time less than about 15 minutes. Using a nip roll short term pressure application, the pressure application preferably is for a time ranging from about 0.02 to about 100 seconds, more preferably for a time ranging from about 0.04 to 50.0 seconds. These time periods are similar in scale to the tacking steps found in conventional lamination lines, and far shorter than the typical 60 to 150 minute commercial autoclave pressure cycle.

The invention is not limited to the use of a nip roll means to develop the de-airing and tacking pressure, however. Provided some minimal short term pressure application is exerted over the laminate, the means for applying the tacking pressure are not critical. Inflatable bags, a press using platens, continuous belts, multiple or staggered rollers, or the like, also could be used.

As used herein, short term tacking pressure application describes pressure on a pre-press assembly for a time sufficient to de-air and tack the interlayer to the glass without necessarily causing permanent flow of the interlayer or forcing complete dissolution of air into the interlayer as is encountered using an autoclave. The minimum pressure that should be applied preferably is at least about 5 psi. The nip roll is a preferred means of applying short term pressure application. The footprint of the rolls (area over which the roll applies pressure) on the laminate varies depending on the nip roll design, and is typically about 10 mm, although this dimension is not critical. The force exerted by the rollers on the laminate preferably ranges from about 2 to 2000 pounds per linear inch of roller (2-2000 PLI; 36-35720 kilogram per linear meter), although pressures outside this range are usable. The time during which nip pressure is applied varies with the speed of the laminate through the nip roll, but is generally not less than 0.02 or more than 100 seconds. As understood by those skilled in the art, the pressure exerted by a nip roll assembly is not sufficient to accomplish the combination of results achieved in a high-pressure autoclave—i.e., drive air into the bulk PVB, eliminate PVB surface roughness, lower residual stresses or promote complete adhesion at the PVB/glass interface.

After tacking pressure is applied, the tacked laminate is heated (in an oven, or optionally in an autoclave at less than standard autoclave pressure) for a time and at a temperature sufficient to develop adhesion, conform the PVB interlayer to the surfaces of and spacing between the substrates, and relax stresses to acceptable levels and dissolve air. This heat history can be similar to that developed in a conventional autoclave process, but is not so limited. As shown in FIG. 1, the tacked assembly 20 may be heat treated in such as a finishing heater unit 14, including oven enclosures 16 and 18 equipped with an array of infrared heater tubes 11, through which the assembly 20 is conveyed on a bed of conveyor rollers 15 powered by a drive motor 17. Alternatively, convection heaters, microwaves, and other equivalent forms of supplying heat, or combinations thereof, also may be used to finish the laminates.

In general, temperatures in the disclosed process exceed typical autoclave temperatures (120° C. to 150° C.), thus accelerating the lamination process. At about atmospheric pressures, pre-press assemblies can be finished, according to the present invention, by heating to temperatures ranging from about 115° C. to 230° C. for durations preferably of about 0.5 to 180 minutes, more preferably about 2 to 60 minutes. Finishing temperatures in the upper region of the noted temperature range preferably are used when laminating PVB sheet with water content in the lower portion of the noted water content range (0.01 to 0.2%); about 150° C. to 220° C. finishing temperatures are particularly preferable when using sheet with a less than about 0.20% water content range. Conversely, finishing temperatures in the lower region of the noted temperature range (125° C. to about 150° C.) preferably are used when laminating PVB sheet with water content in the upper portion of the water content range (0.20 to about 0.35). By way of example, about 130° C. finishing temperatures are preferable when using sheet with a 0.28% water content range. Following heat treatment, the finished laminates are removed from the oven and allowed to cool. Practicing the present process at atmospheric (non-autoclave) pressures is preferred. Although standard autoclave pressures are not required according to the present invention, limited pressures, preferably less than about 3 atmospheres, may be used to enhance finishing of the laminates without bubble formation.

It also is within the scope of the invention to carry out the finishing step using multiple heating cycles. For example, a dual cycle would be characterized by an initial heat soak, a cool-down to a temperature near room temperature, a second heat soak at a temperature that may or may not be equal to the initial heat soak temperature, and a final cool-down to room temperature. Such a finishing step often is helpful in accelerating or enabling the lamination of PVB sheet with water contents in the upper region of the noted range, at temperatures in the upper region of the noted temperature range. Finishing temperatures in each of the heating cycles may range from 115° C. to 230° C. for durations of 0.5 to 180 minutes. The heating steps may be performed back-to-back, or may be separated by large amounts of time, so that the intermediate cooling, and/or holding, step may range from 0 minutes to 50,000 minutes. Intermediate cooling step temperatures may range from −20° C. to 100° C. By way of example, a pre-laminate with a PVB interlayer containing 0.18% water may be finished by placing it in an oven programmed to heat to 180° C. for 30 minutes, cool to 30° C. for 60 minutes, heat once more to 180° C. for 30 minutes, and finally cool to room temperature in 30 minutes.

It also is within the scope of the invention to carry out the tacking and finishing steps at different times. For example, a series of pre-laminates could be batch produced, using the tacking portion of the invented process, which then are allowed to cool down to room temperature. Final heat finishing, as described herein, can be conducted at a later time convenient to the laminator (e.g., a few hours later, the next day, or any later time). This type of non-continuous operation lends itself well to a batch process, in which all the prelaminates are produced ahead of time, staged in racks, and heated together in a final finishing step, similar to an autoclave finishing step, but without the use of autoclave pressure.

Figure 2:
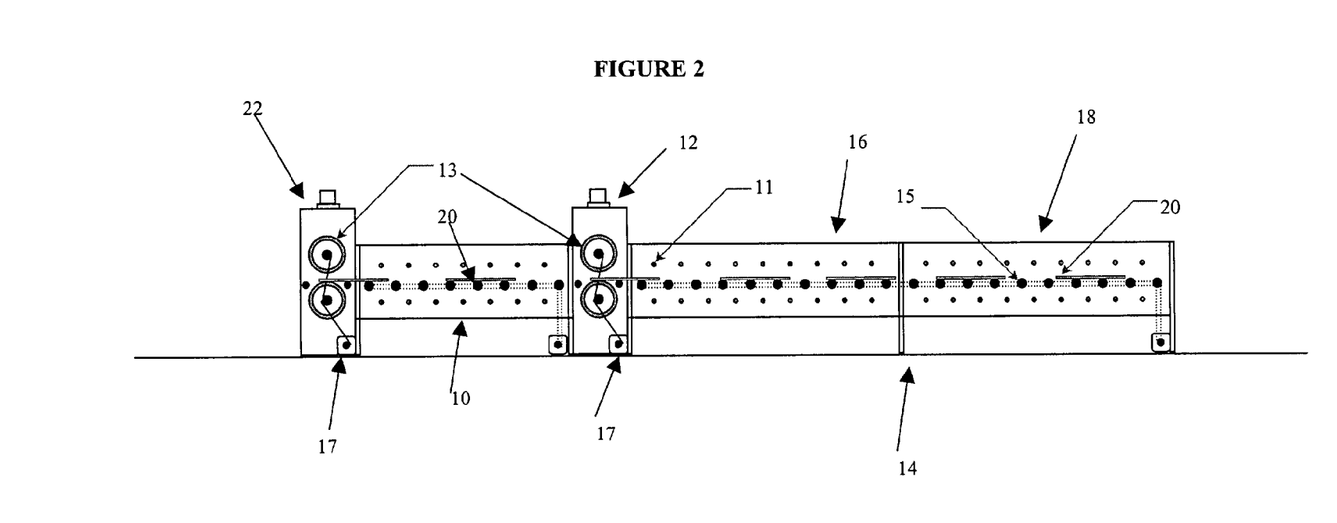
FIG. 2 is a schematic side view showing a second embodiment of apparatus suitable for practicing the present invention. The apparatus as illustrated comprises a preliminary nip roll means, followed by a pre-heater unit, followed by a nip roll means, followed by a finishing heater unit.
Figure 3:
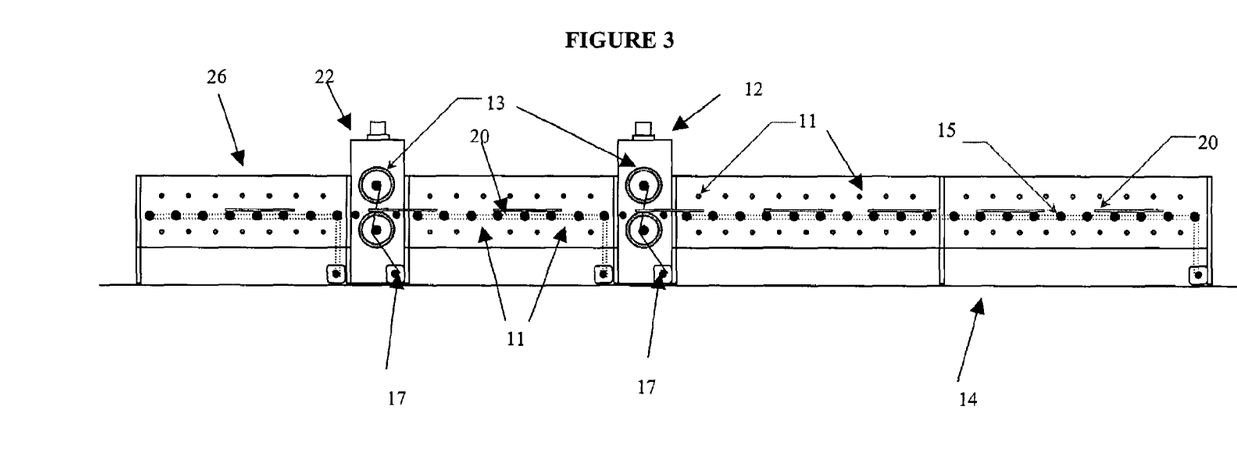
FIG. 3 is a schematic side view showing a third embodiment of apparatus suitable for practicing the present invention. The apparatus as illustrated comprises a preliminary heater unit, followed by a preliminary nip roll means, followed by a pre-heater unit, followed by a nip roll means, followed by a finishing heater unit.

The process of the invention also can be implemented continuously in existing industrial safety glass laminating lines. Conventional lines typically consist of a primary heating zone, primary de-airing nip, secondary heating zone and secondary nip. For example, as depicted in the embodiment of FIG. 2, in order to implement this invention, these lines could be rearranged to a primary nip roll means 22, primary heater unit 10 (adjusted to tacking temperature of about 40° C. to about 130° C., preferably about 70° C. to about 100° C.), nip roll means 12, and finishing heater unit 14 (adjusted to finishing temperatures of about 115° C. to about 230° C., preferably about 180° C.) configuration. With such a rearrangement, the nip rolls 13 of the primary nip roll means 22 induce an extremely light bond between the PVB and glass of assembly 20 without de-airing or sealing the edges. This bond ensures the dimensional stability of the PVB sheet during the primary heating in primary heater unit 10, without adversely affecting the de-airing and edge-sealing functions of the secondary nipping, or tacking step. If the temperature of the glass and PVB is too low to effect such a bond, a preliminary heater unit 26, such as a short oven, may be required at the front of the line to preheat the components of assembly 20 to the correct temperature prior to the primary nip roll means 22 (a configuration as shown in FIG. 3 comprising a preliminary heater unit 26 oven, a primary nip roll means 22, a primary heater unit 10 oven, a nip roll means 12, and a finishing heater unit 14 with a set of ovens).

The invention is not limited to lamination of a single layer of PVB between two sheets of glass. Metal sheets or structural plastic sheets, such as polycarbonate sheets, may be used in conjunction with PVB. Alternative constructions such as layers of PVB and polyurethane laminated to a rigid substrate, such as glass or polycarbonate, readily may be accomplished.

For example, a laminate within the scope of this invention sequentially comprises a first glass sheet, a layer of PVB, a layer of polyethylene terephthalate (PET), a second layer of PVB, and a second glass sheet. In some cases, laminates can comprise metal or polycarbonate sheets with PVB sandwiched between them. Other combinations and other plastic materials usable herein are known to those of ordinary skill in the art. Other plastic materials that may be used according to the present invention include materials such as polyurethane, polyethylene terephthalate, polyvinyl chloride, ionomeric resins, polyolefin elastomers, and other such clear polymeric materials. In addition, patterned plastic layers, or layers featuring specialized properties, such as solar absorbance or reflectance, and the like, readily may be incorporated.

The disclosed process may be used to produce curved glass laminates, such as automotive windshields, rear and side lites, as well as flat glass laminates, such as most architectural or security applications. The process disclosed may be used to produce non-glass laminates, as well as constructions that incorporate more than two sheets of glass. For example laminates can be prepared from sheets of PVB interleaved between layers of polycarbonate. Alternatively multiple layer laminates having alternating layers of glass and PVB can advantageously be made with the present process.

PERFORMANCE TESTS AND PROPERTIES

A) Optical Quality

Laminates were viewed with the naked eye for visual defects such as bubbles or areas where the glass and polymeric interlayer were not in full contact. Optical distortions (lenses) created by variations in interlayer thickness across the laminate were evaluated by placing test laminates under a high intensity xenon light, and searching for light and dark patches created by a lens effect.

B) Pummel Adhesion

Pummel adhesion measures plastic sheet adhesion to glass. The pummel adhesion test was performed to approximate impact dissipation. To measure pummel adhesion, glass laminates were prepared and conditioned to −17° C. and manually pummeled with a 1-pound hammer to break the glass. All broken glass not adhered to the PVB layer was removed. The amount of the glass left adhered was visually compared with a set of standards of known pummel scale, the higher the number of the standard, the more glass remaining adhered to the PVB interlayer (i.e., at a pummel of zero, no glass is left whereas at a pummel of 10, 100% of the PVB layer surface is adhered to the glass). Pummel adhesion value has no units.

C) Bake Failure

Laminates were placed in an oven at 100° C. for about 16 hours, then removed and visually inspected for bubbles. Any single bubble located within the laminate, outside a ¼-inch border area around the periphery of the laminate constituted a failure. If no such bubbles were found within the laminate, the laminates were placed back in the oven and the temperature is raised by 10° C., to 110° C. After one hour at 110° C., laminates were checked again for bubbles. Any laminates failing the test were removed. All laminates passing were put back in the oven and the temperature was raised by 10° C. The laminates were left at that temperature for one hour. This process was continued until all laminates fail.

D) Boil Failure

Laminate sections were submersed in boiling water for two hours and then visually examined for bubble formation. Laminates passing this test show no bubbles within the laminate, excluding the ½ inch border area around the periphery of the laminate.

EXAMPLES

The following examples are provided to further describe the invention. The examples are intended to be illustrative and are not to be construed as limiting the scope of the invention. All parts and percentages are by weight unless otherwise noted.

Example 1

Five sections of PVB sheet initially at 0.43% moisture were cut slightly larger than the desired size of the final laminate and placed in an environmental chamber conditioned to 70° C. with varying relative humidity levels. The sheets were conditioned at 25%, 25%, 22%, 14.5%, and 6% relative humidity and labeled Cases 1, 2, 3, 4, and 5, respectively. Five pairs of glass were also placed in the first chamber at 70° C. and 6% relative humidity. One hour and 15 minutes later, the PVB and glass were removed from the ovens, assembled into five separate pre-presses, trimmed, and passed through a solid rubber nip (0.5 fpm (0.0025 m/s); 30 PLI (536 kg/m)). Following the nip, the first pre-laminate (Case 1) was autoclaved using a pressure and temperature history typical to the lamination industry (185 psi (1.28 Mpa) and 143° C. for a 1 hour cycle). Cases 2 and 5 pre-laminates were placed in a convection oven (at atmospheric pressure) pre-heated to 180° C., and heat soaked for 30 minutes. Case 3 pre-laminate was placed in a convection oven preheated to 115° C. and heat soaked for 180 minutes. Case 4 pre-laminate was placed in a convection oven preheated to 130° C. and heat soaked for 90 minutes.

After cooling to room temperature, the laminates were tested for optical clarity, moisture content, bake failure performance, and boil failure performance (results shown in Table 1). Case 1 contained 0.36% water, by weight, which is currently common in laminated safety glass. It passed all visual inspections and performed reasonably well in high temperature failure testing. The Case 2 laminate also contained 0.36% water by weight. It exhibited small bubbles over the entire surface of the laminate, and consequently failed all visual and high temperature failure tests. The Case 3 laminate, which was produced according to the embodiments of this invention, contained 0.30% water by weight and was completely clear with no visible defects. The Case 4 laminate, which was produced according to the embodiments of this invention, contained 0.20% water by weight and was completely clear with no visible defects. Finally, the Case 5 laminate, which was produced according to the preferred embodiments of this invention, contained 0.11% water by weight and was completely clear with no defects. Cases 3, 4, and 5 passed both high temperature failure tests. The Case 5 laminate exhibited an extremely high bake failure temperature of 230° C. This is typical for laminates prepared according to preferred embodiments of the invention (and featuring water content ranging from about 0.03 to about 0.18 percent by weight of the PVB sheet), which fall in the range of 170° C. to 250° C., as opposed to the 115° C. to 160° C. for laminates produced according to the prior art. Cases 1, 3, 4, and 5 laminates passed all optical tests, exhibiting no bubbles, unbonded areas, or significant optical distortions under high intensity light.

TABLE 1

| Case # | Construction | % Moisture | Visual | Bake Fail | Boil |
|---|---|---|---|---|---|
| 1 | High water content product (autoclaved) | 0.36 | Pass | 130° C. | Pass |
| 2 | Not autoclaved | 0.36 | Fail | Fail | Fail |
| 3 | Not autoclaved | 0.30 | Pass | 140° C. | — |
| 4 | Not autoclaved | 0.20 | Pass | 160° C. | — |
| 5 | Not autoclaved | 0.11 | Pass | 230° C. | Pass |

Example 2

Four sections of PVB labeled Case 1 through 4 were cut slightly larger than the desired size of the final laminate. Case 1 (control) was cut from standard commercial sheet produced by Solutia Inc. Case 2 sheet is identical to the control (Case 1) with the exception that it contains 0.76 grams of magnesium-di-2-ethyl butyrate and 0.29 grams of potassium acetate per kilogram of un-plasticized resin. Case 3 is identical to the control (Case 1) with the exception that it contains 1.016 grams of magnesium-di-2-ethyl butyrate and 0.392 grams of potassium acetate per kilogram of un-plasticized resin. Case 4 is identical to the control (Case 1) with the exception that it contains 1.27 grams of magnesium-di-2-ethyl butyrate and 0.49 grams of potassium acetate per kilogram of un-plasticized resin.

The glass used to make the laminates in Cases 1, 2, 3, 4 was obtained from the PITTSBURGH PAINT AND GLASS COMPANY, of Pittsburgh, Pa., U.S., and is known to produce PVB-to-glass adhesion that is comparable to the rest of the glass industry.

Both the glass and the PVB were placed in a 70° C. oven with a 6% RH environment for 60 minutes. They were then removed from the oven, assembled into pre-presses, trimmed, passed through a solid rubber nip (0.5 fpm (0.0025 m/s), 30 PLI (536 kg/m)), and heated in a convection oven at 180° C. for 30 minutes.

The finished laminates were tested for adhesion using the pummel test described in the PERFORMANCE TESTS section. The results demonstrate that multiple approaches exist to lowering adhesion to moderate levels in laminates prepared according to the invention. Interlayer moisture content in the finished laminate was determined to range from 0.08 to 0.10% water by weight.

TABLE 2

| Case # | Additives | Glass Origin | Pummel Adhesion |
|---|---|---|---|
| 1 | None | PPG | 8.0 |
| 2 | low salt add | PPG | 5.8 |
| 3 | medium salt add | PPG | 3.8 |
| 4 | high salt add | PPG | 2.8 |

Example 3

A section of PVB sheet is cut slightly larger than the desired size of the final laminate and placed, unsupported by glass, in a 70° C., oven with a 6% RH environment for 20 to 30 minutes, or until the sheet water content is reduced below 0.1 weight percent. Two panes of glass are also placed in an oven and allowed to stabilize to 70° C. The PVB and glass are then removed from the ovens, laid up at room temperature, trimmed, and passed through a solid rubber nip (0.5 fpm (0.0025 m/s); 30 PLI (536 kg/m)). Following the nip, the laminate is placed in a convection oven (at atmospheric pressure), which has been pre-heated to 180° C., and heat soaked for a total of 10 minutes. It is then removed from the oven and allowed to cool. It is anticipated that the performance properties should be comparable to those of Example 1, Case 5, above.

Example 4

A PVB roll is unwound into a chamber heated to 50° C., 6% RH. The residence time of the sheet in the chamber is 25-35 minutes, sufficient for the water content to be reduced to below 0.10 weight percent. After exiting the chamber the PVB is laid up between two panes of glass and trimmed at the laminate edges. As represented in FIG. 1 of the drawings, the laminate 20 is then moved onto conveyor rollers 15 where it is heated to 70° C. by an IR heater tubes 11, passes through nip rolls 13 (30 PLI (536 kg/m), rotating at 0.5 fpm (0.0025 m/s)), and moves through a finishing heater unit 14 (wherein IR heater tubes 11 heat laminate 20 to 175° C. in 3 minutes, no high temperature hold time). Following a short cooling zone, the laminate 20 is removed from the terminal end (proceeding left to right in FIG. 1) of the conveyor rolls 15. It is anticipated that the performance properties should be comparable to those of Example 1, Case 5, above.

Example 5

A PVB roll is unwound into a chamber heated to 50° C., 6% RH. The residence time of the sheet in the chamber is 25-35 minutes, sufficient for the water content to be reduced to below 0.10 weight percent. After exiting the chamber the PVB is laid up between two panes of curved glass, such as that used in auto side lites, and trimmed at the laminate edges. The laminate is then moved onto a conveyor where it is heated to 70° C. by convection heat, passes through a segmented nip roll (multiple rolling disks, approximately 1 inch thick, each under 30 PLI (536 kg/m), rotating at 0.5 fpm (0.0025 m/s)), and moves through a continuous convection heating zone that heats the laminate to 160° C. and holds the temperature for 20 minutes. Following a short cooling zone, the laminate is removed from the conveyor. It is anticipated that the performance properties should be comparable to those of Example 1, Case 5, above.

Example 6

Figure 5:
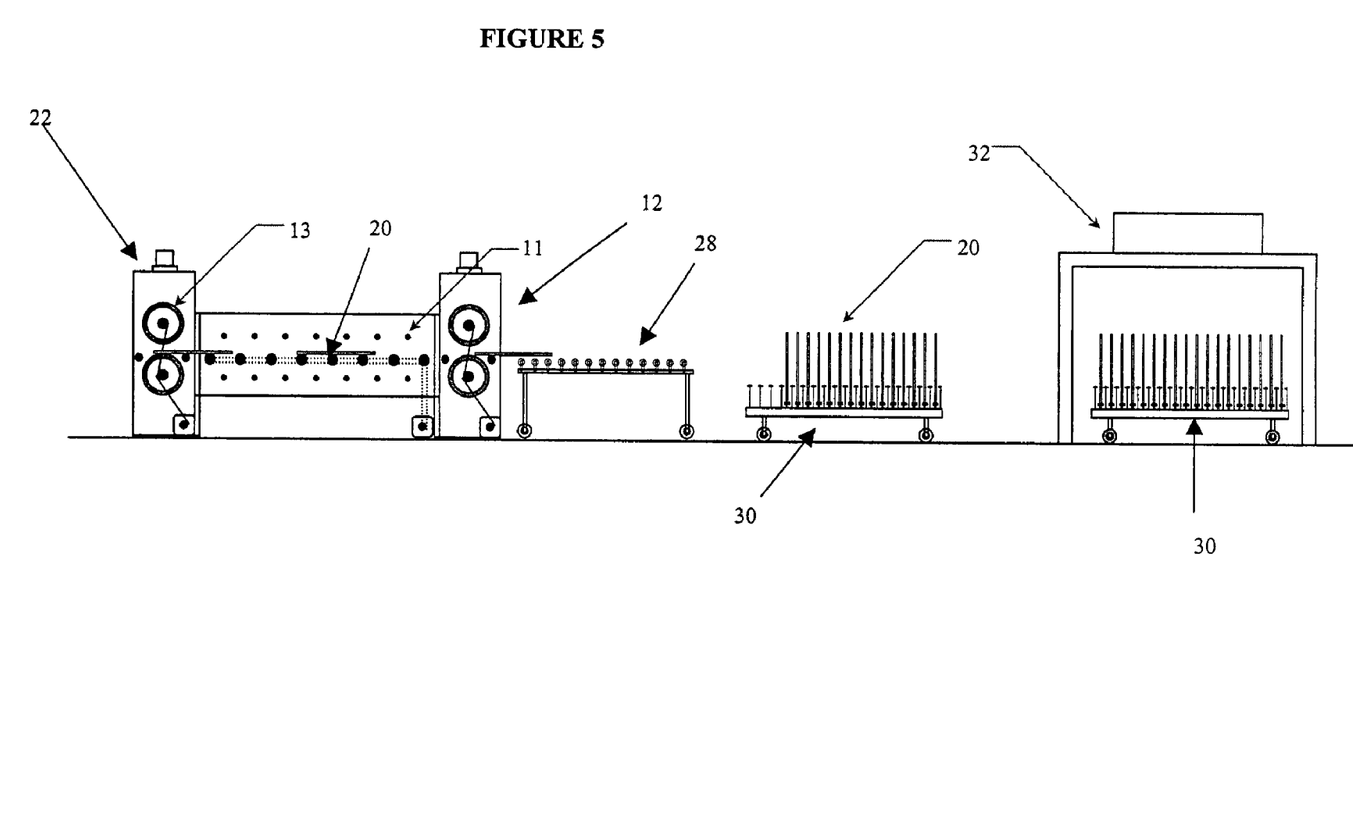
FIG. 5 is a schematic side view showing a fifth embodiment of apparatus suitable for practicing the present invention. The apparatus as illustrated comprises a nip roll means, followed by a pre-heater unit, followed by a second nip roll means, followed by an unloading conveyor rack, followed by a staging rack, followed by a finishing heater unit.

A PVB roll with a sheet water content of 0.1 percent by weight is unwound onto a sheet of glass. A second sheet of glass is placed on top, and the assembly is trimmed to remove the excess PVB. Referring to FIG. 5, the laminate 20 assembly is run through a primary nip roll assembly 23, operating at 30 PLI and 10 fpm in order to induce a light tack between the glass and the PVB, but not sufficient to seal the edges. The laminate 20 then moves through an IR heated primary heater unit 10 where the laminate assembly is quickly heated to 70° C. Once heated, the laminate 20 passes through a second nip roll assembly 12, also set for 30 PLI (536 kg/m) and 10 fpm (0.051 m/s), which de-airs the glass/PVB interface, tacks the materials together, and seals the edges to prevent air re-entry. The finished laminate 20 exits the nip roll assembly 12 onto roller platform 28 and then is staged in rack 30. This procedure is repeated until rack 30 is full of tacked, but not finished, laminates 20. The rack 30 then is rolled into finishing heater unit 32, in this Case a large oven that heats the entire assembly to 180° C. and holds the temperature for 20 minutes before cooling back down to room temperature. It is anticipated that the performance properties should be comparable to those of Example 1, Case 5, above.

Example 7

Figure 4:
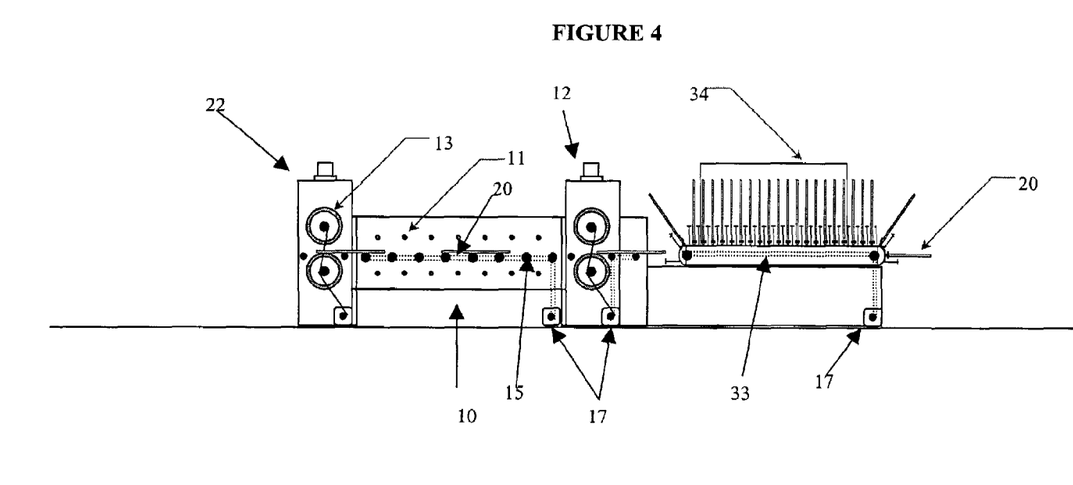
FIG. 4 is a schematic side view showing a fourth embodiment of apparatus suitable for practicing the present invention. The apparatus as illustrated comprises a preliminary nip roll means, followed by a pre-heater unit, followed by a nip roll means, followed by vertical conveyor finishing heater unit.

A PVB roll with a sheet water content of 0.1 percent, by weight is unwound onto a sheet of glass. A second sheet of glass is placed on top, and the assembly is trimmed to remove the excess PVB. Represented in FIG. 4, the glass/PVB/glass laminate 20 assembly is run through a primary nip roll assembly 22 operating at 30 PLI (536 kg/m) and 3 fpm (0.015 m/s) in order to induce a light tack between the glass and the PVB, but not sufficient to seal the edges. The laminate 20 then moves through an IR heated primary heater unit 10 where the laminate assembly is quickly heated to 70° C. Once heated, the laminate 20 passes through a second nip roll assembly 12, also set for 30 PLI (536 kg/m) and 3 fpm (0.015 m/s), which de-airs the glass/PVB interface, tacks the materials together, and seals the edges to prevent air re-entry. Exiting the nip roll assembly 12, the laminates 20 (in pre-laminate stage) are up-ended by vertical conveyor unit 33 and processed through finishing heater unit 34, in this configuration comprising an oven including a convection heating zone heated to 200° C., followed by a short cooling zone. The total times in the heating and cooling sections are 30 and 10 minutes, respectively. (The continuous vertical conveyor is common to the lamination industry and can be purchased from Tamglass, located in Sweden.) It is anticipated that the performance properties of the finished laminates should be comparable to those of Example 1, Case 5, above.

Certain modifications may be made in details of the above description of the invention without departing from the spirit and scope of the invention defined in the appended claims. Accordingly, it is intended that all matter contained in the above description, or shown in the accompanying drawings be interpreted as illustrative and not limiting in nature.

What we claim is:

1. A process for making a laminate comprising: positioning a plastic material selected from the group consisting of polyvinyl butyral and ionomeric resins, having a moisture content below 0.35 percent by weight of the plastic material, opposite at least one rigid substrate;

pre-heating the at least one rigid substrate, or the plastic material, or any combination thereof, to a tacking temperature of about 40° C. to about 130° C.;

tacking the plastic material and the at least one rigid substrate through a nip roll in a short term pressure application having a duration of less than about 15 minutes, without using vacuum de-airing, to form a pre-laminate having partial adhesion of plastic material to the substrate;

heating the pre-laminate at a temperature of about 125° C. to about 220° C. for a time effective to relax stresses in and dissolve air into the plastic material and finish bond the plastic material to the at least one rigid substrate;

wherein said heating is conducted at a pressure ranging from about 1 atmosphere to about 3 atmospheres;

without a subsequent or preceding autoclave step at a pressure above about 3 atmospheres.

2. The process of claim 1, for making a laminate wherein the positioning step further comprises:

interposing the plastic material, having a moisture content below 0.35 percent by weight of the plastic material, between two rigid substrates.

3. The process of claim 1, wherein said pre-heating is at a temperature ranging from about 70° C. to about 100° C.

4. The process of claim 1, wherein the short term pressure application is for a duration of about 0.02 to about 100 seconds.

5. The process of claim 4, wherein the short term pressure application is for a duration of about 0.04 to about 50 seconds.

6. The process of claim 2, wherein the short term pressure application is at a pressure of at least about 5 psi.

7. The process of claim 2, wherein the heating is for a time ranging from about 0.5 minutes to about 180 minutes.

8. The process of claim 7, wherein the heating is for a time ranging from about 2 to about 60 minutes.

9. The process of claim 1, wherein said heating is conducted at a pressure of about 1 atmosphere.

10. The process according to claim 2, wherein said plastic material is a polyvinylbutyral sheet.

11. The process according to claim 10, wherein at least one of said substrates is glass.

12. The process according to claim 10, wherein said polyvinylbutyral sheet has a moisture content below about 0.30 percent by weight of said polyvinylbutyral sheet.

13. The process according to claim 12, wherein said moisture content is between about 0.01 and about 0.20 percent by weight.

14. The process according to claim 13, wherein said moisture content is between about 0.03 and about 0.18 percent by weight.

15. The process according to claim 2, wherein multiple layers of plastic material are sandwiched between two rigid substrates.

16. The process according to claim 1, wherein said short term pressure application is at a pressure of about 2 to about 2000 pounds per linear inch.

17. The process according to claim 15, wherein at least two of said multiple layers of plastic material comprise different plastic materials.

18. A process for making a laminate comprising:

interposing a polyvinylbutyral sheet, having a moisture content between about 0.01 and about 0.20 percent by weight, between two rigid substrates;

tacking the polyvinylbutyral and the substrates together and sealing edges to form a pre-laminate;

passing the prelaminate through a nip-roll short term pressure application without using vacuum de-airing for a duration of about 0.02 to about 100 seconds; and heating at a temperature of about 150° C. to about 220° C. at a pressure of about 1 atmosphere to about 3 atmospheres for about 0.5 minutes to about 180 minutes to bond the polyvinylbutyral to the substrates and form a laminate without a subsequent or preceding autoclave step at a pressure above about 3 atmospheres.

19. The process of claim 18, wherein said heating is conducted at a pressure of about 1 atmosphere.

20. The process according to claim 18, comprising the step of conditioning said polyvinylbutyral sheet to reduce the moisture content to a range of about 0.01 to about 0.20 percent by weight of said polyvinylbutyral sheet.

* * * * *